United States Patent [19]
You et al.

[11] Patent Number: 5,668,423
[45] Date of Patent: Sep. 16, 1997

[54] EXCITER FOR GENERATING VIBRATION IN A PAGER

[76] Inventors: Dong-Ok You; Ok-Jung You, both of 23 Ashin 1-ri, Okcheon-myun, Yangpyung-gun, Kyunggi-do, Rep. of Korea

[21] Appl. No.: 619,397

[22] Filed: Mar. 21, 1996

[51] Int. Cl.⁶ .............................. H02K 7/065; G08B 5/22
[52] U.S. Cl. .................. 310/81; 310/40 MM; 310/80; 310/89; 310/156; 340/311.1; 340/407.1; 340/825.44
[58] Field of Search .............. 310/81, 80, 164, 310/89, 156, 261, 40 MM; 340/407.1, 311.1, 825.44

[56] References Cited

U.S. PATENT DOCUMENTS

| | | | |
|---|---|---|---|
| 5,175,459 | 12/1992 | Danial et al. | 310/81 |
| 5,341,057 | 8/1994 | Yamaguchi et al. | 310/81 |
| 5,448,117 | 9/1995 | Elliott | 310/49 R |
| 5,528,697 | 6/1996 | Saito | 381/192 |

FOREIGN PATENT DOCUMENTS

6120866  4/1994  Japan.

Primary Examiner—Steven L. Stephan
Assistant Examiner—Tran N. Nguyen
Attorney, Agent, or Firm—Lowe, Price, LeBlanc & Becker

[57] ABSTRACT

Disclosed is an exciter for generating physical vibration in response to the applied electric signal. In this device, a driving coil is attached to the periphery of an inner guide of a lower housing, and a rotor of permanent magnet is provided in the rotor-receiving space of the inner guide, both ends of the rotor being rotatably supported to the inner guide. An upper housing is engaged with the lower housing in such a manner that the upper housing surrounds the driving coil. In this device, the rotation shaft of the rotor is on a shifted state with respect to a center of a gravity of the rotor, by which means the exciter generates vibration through the upper and lower housings when the rotor rotates by the electromagnetic force of the driving coil.

16 Claims, 7 Drawing Sheets

EXCITER FOR GENERATING VIBRATION IN A PAGER

BACKGROUND OF THE INVENTION

The present invention relates in general to an exciter for generating vibration when an incoming call is received in a mobile communication receiver such as radio pager, and more particularly to an exciter which uses rotation movement of a magnet rotor having an unbalanced weight structure to generate a desired physical vibration of high quality and to have simple structure, simple manufacturing process and low manufacturing costs.

DESCRIPTION OF THE PRIOR ART

An exciter, commonly named "pager motor", is a vibrating device for generating the physical vibration so as to sense an incoming call transmitted in a radio pager or mobile communication receiver.

Typical exciters are very compact, of which diameters are about 6 mm. and basically includes a micro motor of which manufacture are very difficult and an unbalanced weight coupled to a shaft of the motor. Such exciters employs a static unbalanced vibration method which generates vibrations based on the centrifugal force resulted from the rotation movement of the motor.

Figure 1:
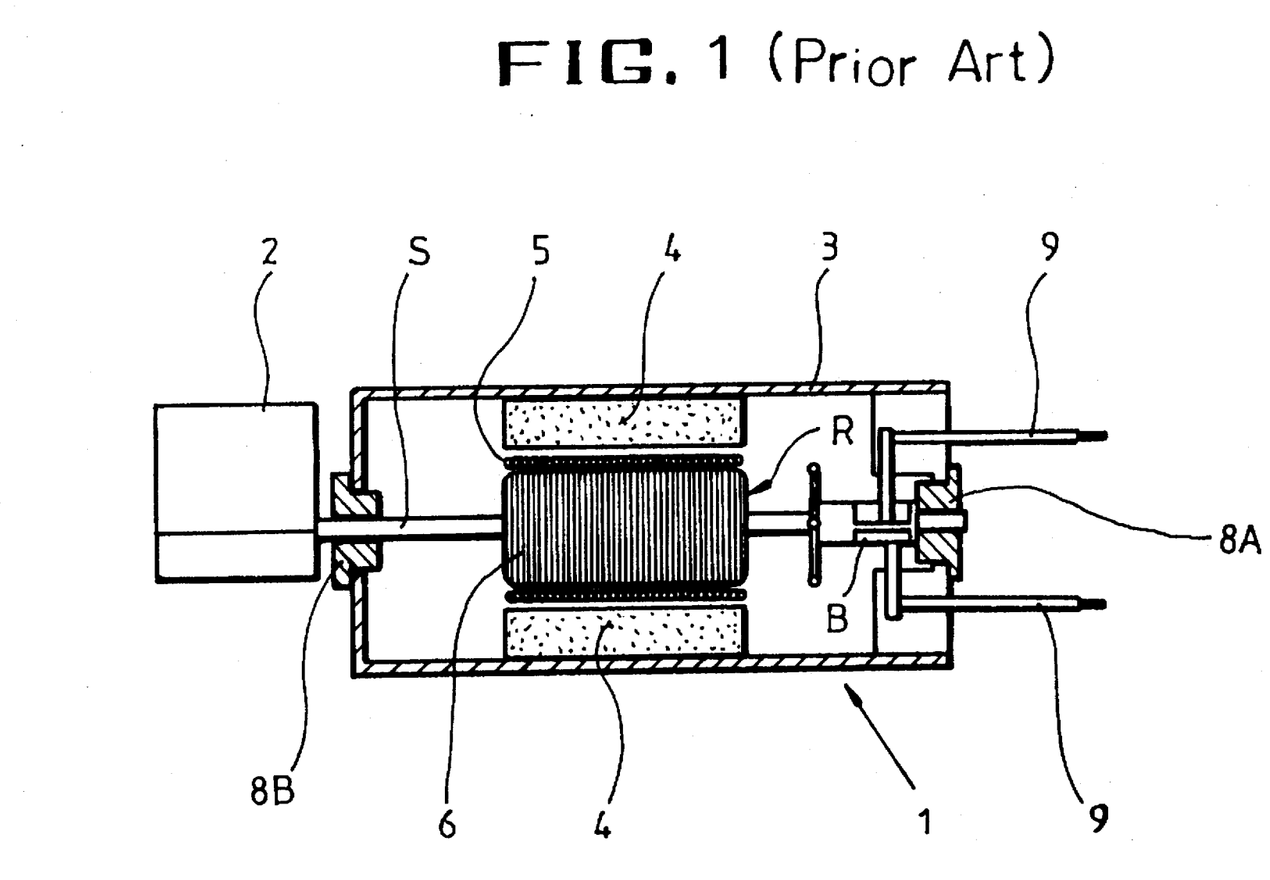
FIG. 1 is a cross-sectional view of a prior art motor type exciter.

In the prior art exciter, as shown in FIG. 1, there are a housing 3 which forms external shape of a motor 1, a permanent magnet 4 attached to the inside of the housing 3, and a rotor R provided in the center of the housing 3 and engaged with a core 6 on which a driving coil is wound. At the ends of the rotation shaft S of the rotor R, coupling members 8A and 8B are provided to facilitate rotation movement of the rotor R. Further, an unbalanced weight 2 is engaged with outwardly extended portion of the rotation shaft S of the rotor R to generate the centrifugal force.

In this exciter, provided that driving current from an input terminal 9 is applied to the driving coil 5 through a brush B, the rotor R mounted in the motor 1 is subjected to the rotation force based on Fieming's left-hand rule between electromagnetic force by the driving coil 5 and magnetic field by the permanent magnet 4. The resultant rotation force of the rotor R is transmitted to the unbalanced weight 2, assembled by an artificial operation, for transferring the center of the gravity, thereby generating a centrifugal force which functions as vibration which can yield movement of the entire motor.

In the typical exciter using the motor as mentioned above, the important parameters to convert the vibration force are rotation speed of the motor, weight of the unbalanced weight, and asymmetry structure of coupling members provided at each ends of the rotation shaft of the rotor. Noted that popular used DC motor is supplied with electric energy of about 0.9 to 1.3 V if excluding a voltage applied to the driving circuit in spite of application of 1.5 V externally. To obtain increased vibration force, the possible subjects to be considered are to increase electric energy, to change magnetic material, or to increase the winding number of the coil, and however these methods would means a drastic increase in the manufacturing costs.

Further, in these days, the requirements for production of the mobile communication receiver mounting the exciter therein which have the minimum size and weight, have increased. To meet these requirements, elements of the device are constructed to be the smallest possbie size, and however many disadvantages may occur. For example disconnections of the wound wire of the driving coil are often generated and the degree of difficulties in a manufacturing process increases, resulting in increase of the manufacturing costs. In addition, the typical exciter of the motor type has an inappropriate structure to mount in the pager using automatic mounting system. This makes simplification of the assembly process impossible.

Another disadvantage is that undesirabe electric noise may occur when power is applied to the rotor through the brush.

In addition, there is another exciter having electrodynamic coil such as speaker of which vibration plate reciprocates in the upper and lower directions. However if it is small in size, the vibration force is also small and thus sufficient vibration is not transmitted to the set to be mounted.

Consequently, in the prior known exciters, the moving coil type exciter has a weak vibration force, whie the motor type exciter has a difficulty in mounting on the set by automatic mounting system and demands for the smallest possible size brings a drastic increase in manufacturing costs, even though having a sufficient vibration force.

SUMMARY OF THE INVENTION

It is a general object of the present invention to provide an exciter which substantially eliminates those disadvantages inherent in both the construction, use and availability of the prior known apparatus.

Another object of the present invention is to provide an exciter which is of substantially simple and inexpensive and which can create sufficient vibration force in spite of small size.

Still another important object of the present invention is to provide an exciter which can be assembled easily in the set by automatic mounting system, thus permitting a low cost supply cost.

To achieve these objects, there requires a completely new apparatus which itself can creats unbalance of the center of gravity independently of a motor-driven rotation movement in virtue of such a structure.

To meet this requirement, after repeated researches has been pursued, this exciter can be produced by combining a driving coil attached to the housing to produce an alternating magnetic field with a rotor using a permanent magnet located rotaatably in the driving coil so as to rotate in response to electromagnetic force of the driving coil and to create vibration by its unbalanced weight structure or shocks.

In view of this, it is provided an exciter for generating physical vibration in response to an incoming call, comprising: a lower housing having a base and a cylindrical inner guide which is vertically disposed on the base, the inner guide having an upper opening to form a predetermined space at a central portion; a stator, attached to a periphery of the inner guide of the lower housing, for generating an electromagnetic force which is converted in an upper or lower direction responsive to an AC signal from outside; a rotor having a rotation part disposed in the inner space of the inner guide, both side ends of the rotation part being rotatably supported to both side walls of the inner guide, for rotating responsive to the electromagnetic force; and an upper housing having a pair of inwardly projecting portions engaged with the inner guide of the lower housing to rotatably support both side ends of the rotator, and a outer cylindrical portion engaged with the lower housing to surround the stator, whereby the exciter generates vibration at the upper and lower housings responsive to the rotation movement of the rotator.

The rotor is comprised of a permanent magnet, a magnet housing surrounding the permanent magnet, and a pair of axial guides, each being in the opposed direction, disposed on both sides of the magnet housing to function as the rotation shaft of the permanent magnet.

A center of gravity of the rotor is on the shifted state from a connection line of both side ends thereof, or has an asymmetry structure with respect to the plane including the connection line connecting both side ends thereof. As a result, the rotor has an unbalanced weight structure, thereby generating physical vibration at the upper and lower housings when rotating.

Differently from the above, in case the rotor has a symmetry structure with respect to the rotation shaft, a pair of projecting portions is provided to define the rotation movement of the rotor within the inner guide of the lower housing, and thus the physical vibrations are generated by rotation shocks.

DETAILED DESCRIPTION OF THE PREFERRED EMBODIMENT

This invention will now be described below with reference to the accompanying drawings.

Figure 2:
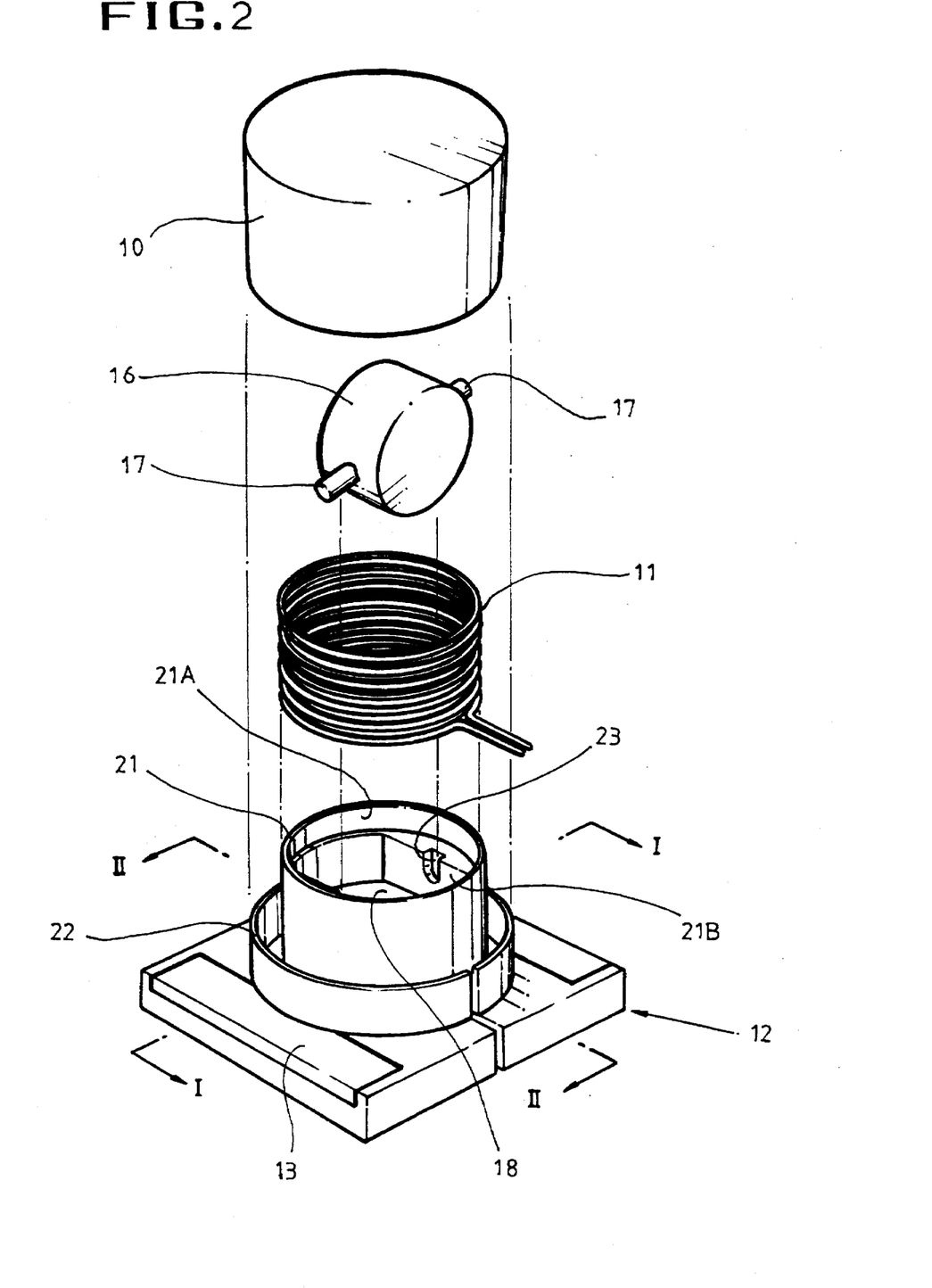
FIG. 2 is an exploded perspective view of a preferred embodiment of an exciter according to the present invention.
Figure 3A:
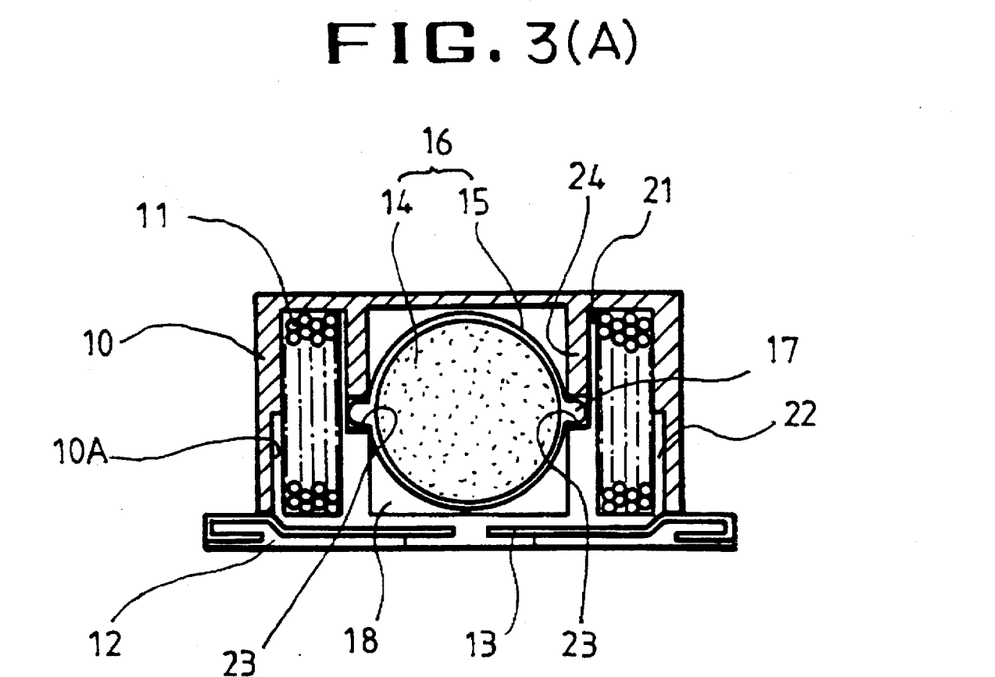
FIG. 3A is a cross-sectional view of the assembled exciter shown by FIG. 2 taken along the line of I—I.
Figure 3B:
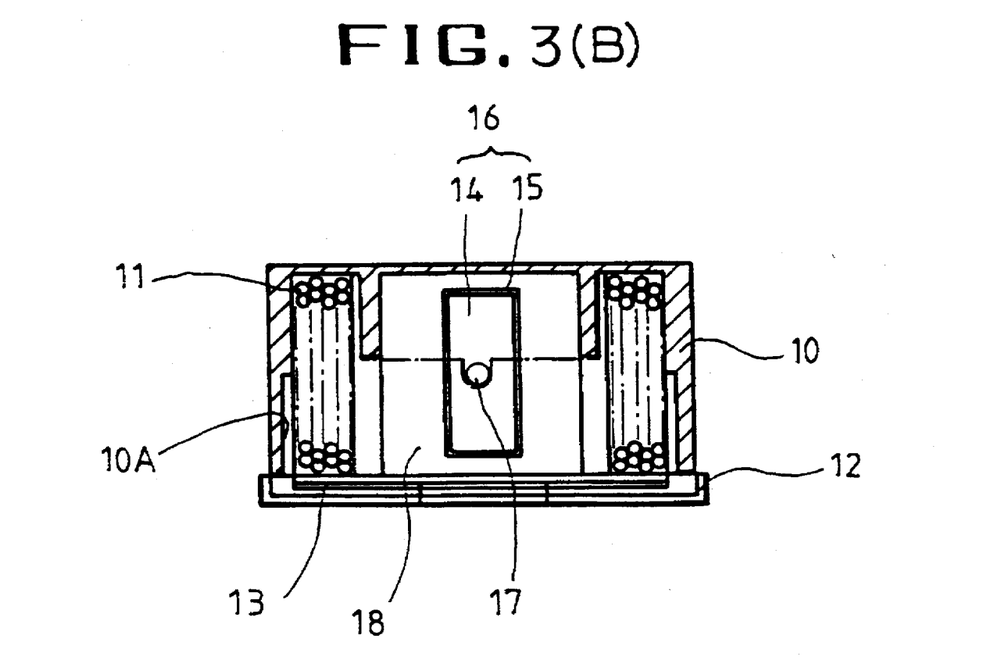
FIG. 3B is a cross-sectional view of the assembled exciter shown by FIG. 2 taken along the line of II—II.

As shown in FIGS. 2 and 3, an exciter of a first preferred embodiment of this invention includes upper and lower housing 10 and 12 made of nonmagnetic material such as resin, and the external shape of the exciter is constituted by the upper housing 10 which functions as upper cover and the lower housing 12 on which an electrode terminal 13 is formed to supply electric energy in response to a driving signal when any incoming call is received in a radio pager or mobile communication receiver. This exciter is round or rectangular.

The lower housing 12 opened upwardly is provided with a cylindrical inner guide 21 having an inwardly projecting part 21A and an outer guide 22 arranged with a regular interval from the inner guide 21 and having a height lower than that of the inner guide 21, and a wound moving coil 11 is disposed between the inner guide 21 and the outer guide 22 for generating electromagnetic force. The inner space is used as a space for receiving a moving magnet 16. The moving magnet 16 is formed by the permanent magnet 14 molded in the magnet housing 15, and a pair of axial guides 17 are provided on the outer surface of the magnet housing 15, which function as rotation shaft of the moving magnet 14.

Further, a pair of grooves 23 corresponding the pair of axial guides 17, are formed at both coners between stepped portions 21A and opposed inner sides 21B of the inner guide 21.

On the other hand, the upper housing 10 is formed of a cylinderical cap having a stepped portion 10A at the inner bottom thereof to cover the moving coil 11, the stepped portion 10A being externally engaged with the outer guide 22 of the lower housing 12. In the upper surface of the upper housing 10, the round downward extension 24 is provided, which is coupled to the inner side of the stepped portion 21A of the inner guide 21, giving rooms for the groove 23 where the axial guide 17 will be accommodated. This structure, therefore, enables the moving magnet 16 to rotate with respect to the axial guide 17 inserted to the groove 23, preventing the undesired breakaway thereof.

In such a structure, the space 18 for rotation of the moving magnet 16 can be left as an empty state, or a vibration transferring material which is formed of an inert fluid having high viscosity such as magnetic fluid, can be charged in the space 18 to obtain an improved vibration.

The operation of the exciter of this invention will now be described below.

The AC driving voltage is applied to the driving coil 11 provided between the inner guide 21 and the outer guide 22 through the electrode terminal 13 inserted to the lower housing 12. An electromagnetic field generated from the driving coil 11 under the right screw's principle of Ampere and a magnetic field generated from the moving magnetic 16 formed of the permanent magnet 14 are interacted, so that a driving force F for driving the moving magnet 16 is generated as the following equation under the Fleming's left-hand principle:

$$F = BIL \sin \theta (N)$$

where B is the magnetic field of the permanent magnet, I is a current flowing the driving coil 11, L is a length of the driving coil, $\theta$ is a crossing angle between magnetic flux from the driving coil and the permanent magnet 14 for the moving magnet 16. Here, the force F enables the moving magnet 16, to which the axial guides 17 are rotatably supported, to be rotated.

In this exciter, when alternating current(AC) is used as energy source to facilitate continuous clockwise rotation or the counterclockwise rotation of the moving magnet 16, the alternating magnetic flux is periodically produced from the driving coil 11 in response to the application of AC energy, thus permitting the continuous rotation of the moving magnet 16 disposed in the driving coil 11.

Figure 4:
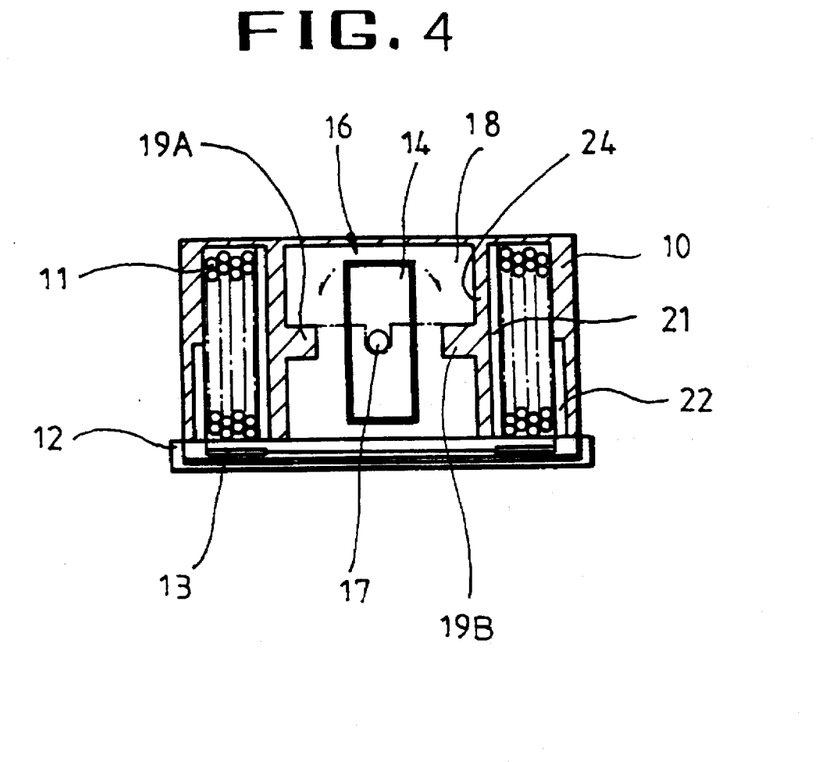
FIG. 4 is a cross-sectional view of another preferred embodiment of an exciter according to the present invention.

The exciter of FIG. 4 has a scheme which generates the vibration on the condition that the axial guides 17 are provided on the extending line of the rotation axis passing through the center of the gravity of the moving magnet 16, equal to that of FIG. 3. In this case, a pair of projecting parts 19A and 19B are provided at the middle portion of the inner side of the upper housing 10, to define the the rotation movement of the moving magnet 16 within the scope of 45° to the left and right directions and utilize shocks applied to the projecting parts 19A and 19B according to the rotation of the moving magnet 16, as physical vibration source. Such a constructed device is generally called as a repeat-striking type exciter. Here, the projecting parts can be disposed on the inner walls of the space 18.

Figure 5A:
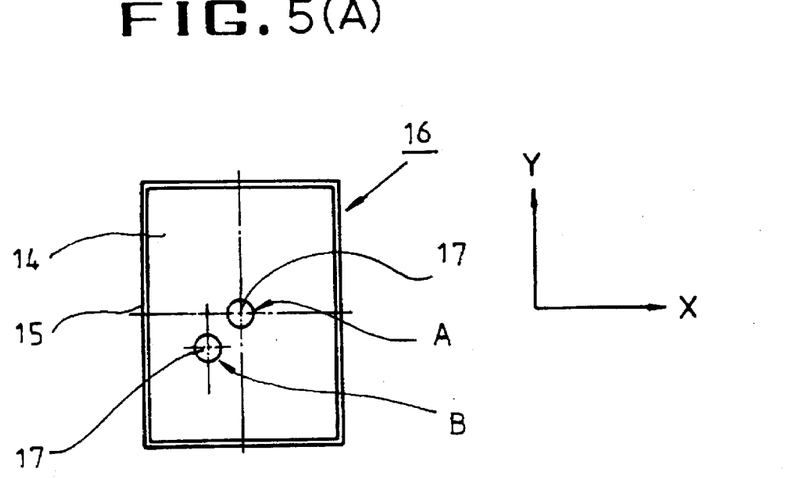
FIGS. 5A through 5C are cross-sectional views of moving magnets each having a different modified structure with respect to an axial guide of an exciter of the present invention.

FIG. 5A illustrates the structure of the moving magnet 16 that the opposing axial guides 17 are disposed on both ends of a line A passing through the center of the gravity of the moving magnet 16. Here, the position of the axial guides 17 can be modified in several ways, and thus vibrations are generated by moving force of different mode at each position.

In this figure, it is possible that the opposing guides 17 are disposed on a line B shifted from the line A as much as a predetermined distance to the direction of X or Y cordinate parallel to the line A.

Figure 5B:
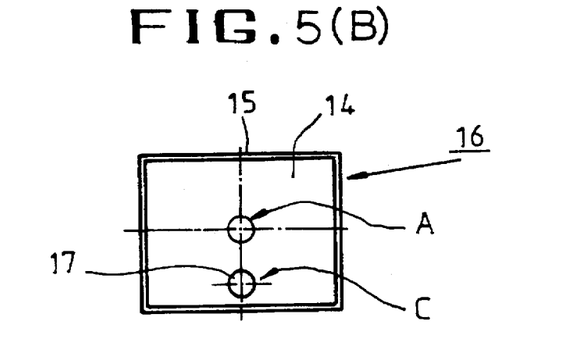

Further, the structure shown in FIG. 5B is another example of the axial guides 17 showing that the axial guides 17 are disposed on a line C shifted from the line A passing through the center of the gravity of the magnet housing 15 toward the axis Y as much as a predetermined length. This structure is designed in such a manner that distribution of weight is asymmetry in one direction from the center of the gravity, so that the center of the gravity is changed according to the moving direction of the moving magnet 16, thereby producing physical vibration. At this time, the vibration force responsive to the rotation of the asymmetry moving magnet 16 is transmitted to the upper and lower housings 10 and 12 through the axial guides 17. Such transfer of the center of the gravity, as mentioned above, depends on the setting position of the axial guide 17, and it is possible that such positions of the axial guides 17 are shifted on either shaft X or Y cordinate, or both X and Y cordinates at the same time.

Figure 5C:
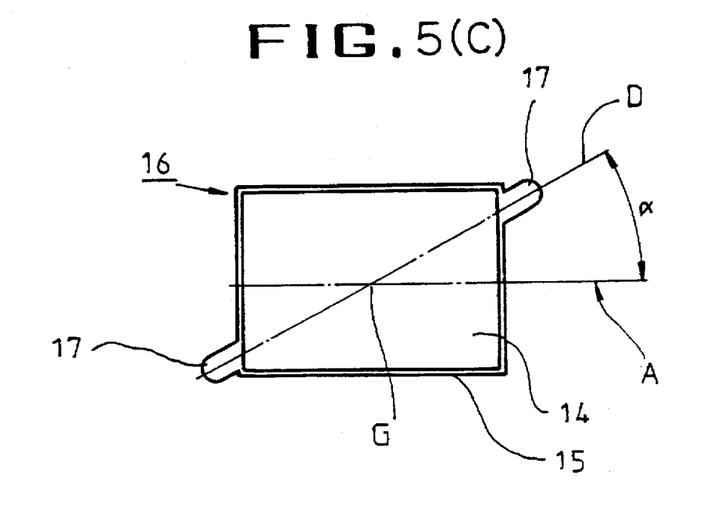

On the other hand, still another example is illustrated in FIG. 5C which shows the axial guides 17 are arranged in a manner that both ends of the axial guide 17 are located on a line D rotated in the clockwise or counterclockwise direction with respect to the line A passing through the center of the gravity of the moving magnet 16 as much as a predetermined angle α, centering the center G of the gravity. This is to induce two asymmetry weight structures, what is called as "Moment Unbalance Structure". In this structure, bi-directional changes of the center of the gravity generated from the movement of the moving magnet 16 in response to the alternating magnetic flux of the driving coil 11 are used as vibration generating source.

Figure 6:
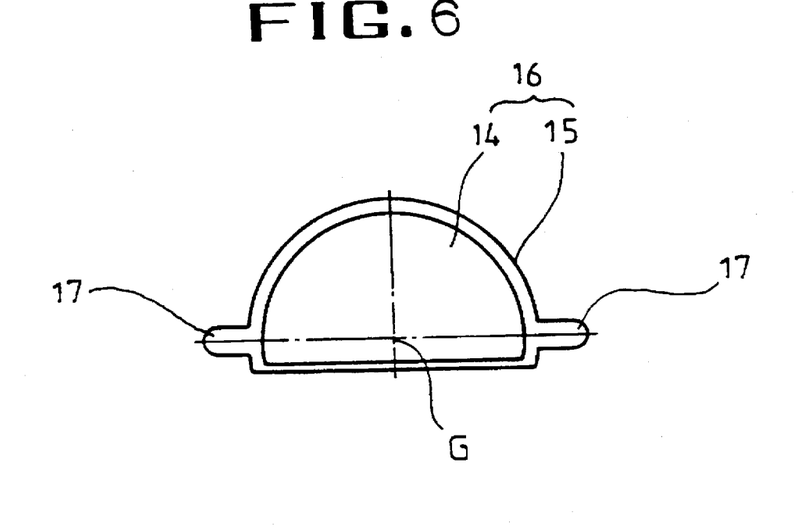
FIG. 6 is a cross-sectional view showing a moving magnet, with permanent magnet partially broken away according to the present invention.

The above description is to prove that the center of the gravity of the moving magnet 16 is shifted in response to the change of the axial guide 17, however, another unbalance weight structure can be obtained in such a manner that the axial guides 17 are arranged to the center G of the gravity of the moving magnet 16 and the partial lower part of the permanent magnet 14 is broken away as shown in FIG. 6.

In the resultant exciter, the upper and lower housings 10 and 12 are made of plastic material having good heat-resistance and suitable for the injection molding process, and the electrode terminal 13 is easily molded into the lower housing 12 by the insert injection molding process. The electrode terminal 13 can be selected among plate, wire and rugged types according to the set to be mounted.

Figure 7A:
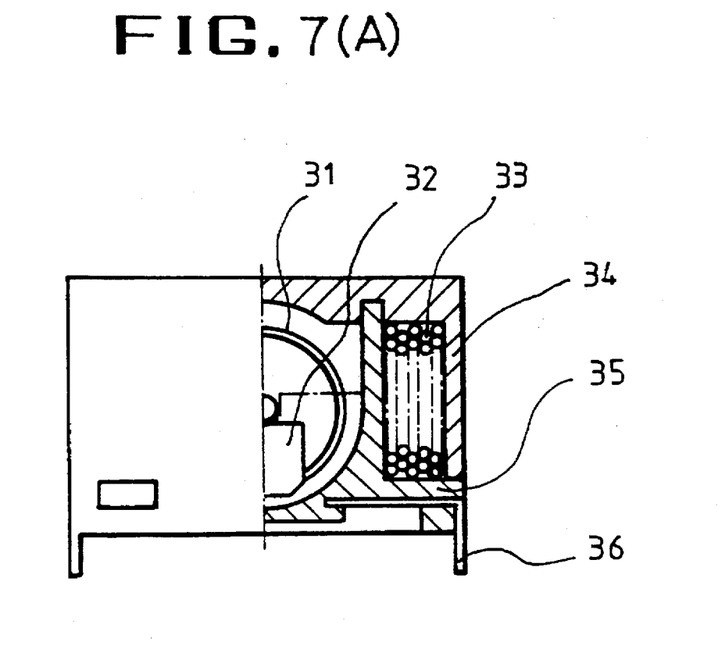
FIGS. 7A and 7B are front view and side view of still another preferred embodiment of an exciter according to the present invention.
Figure 7B:
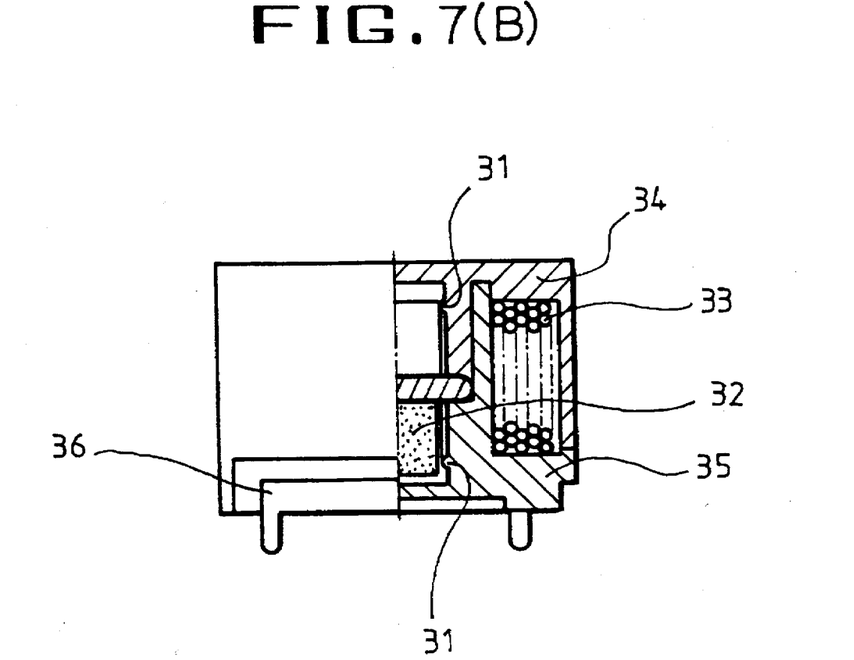

FIG. 7 illustrates a third embodiment of this exciter, where reference numeral 31 is a rotor guide, 32 a rotor, 33 a driving coil, 34 an upper housing, 35 a lower housing, and 36 a rugged type terminal.

In this figure, the combination structure of the upper housing 35 and the lower housing 34 is somewhat different from that of the first embodiment, and the rotor-receiving space forms a substantially round-shape in the upper and lower housings 34 and 35. The third embodiment employs a structure that the outer guide of the lower housing is broken away and the support strength of each element is increased substantially, while having a simple structure, and simple process is available. This exciter is operated in the same manner with the above-mentioned embodiments.

Figure 8A:
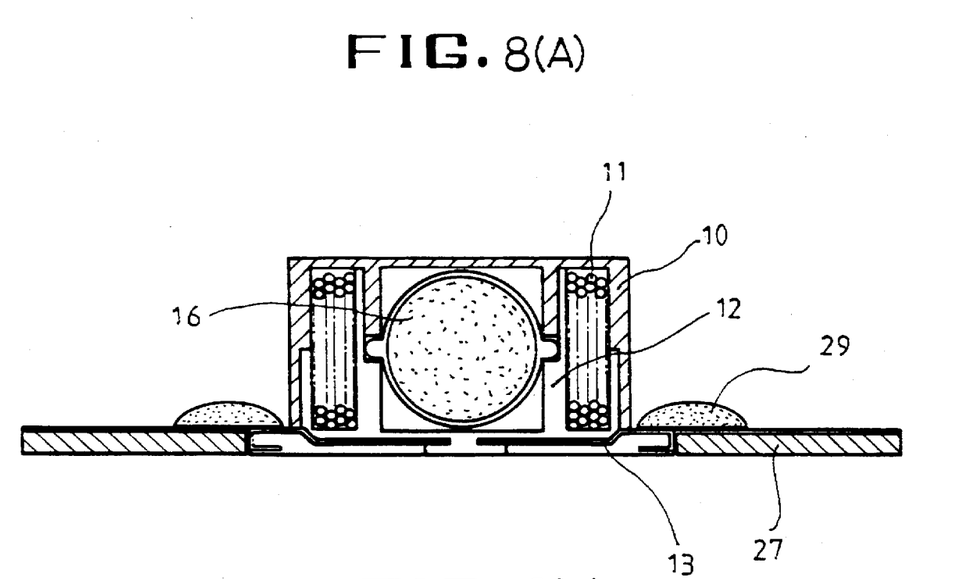
FIGS. 8A and 8B are cross-sectional view each showing an exciter having plate type electrode terminals mounted on a printed circuit board.
Figure 8B:
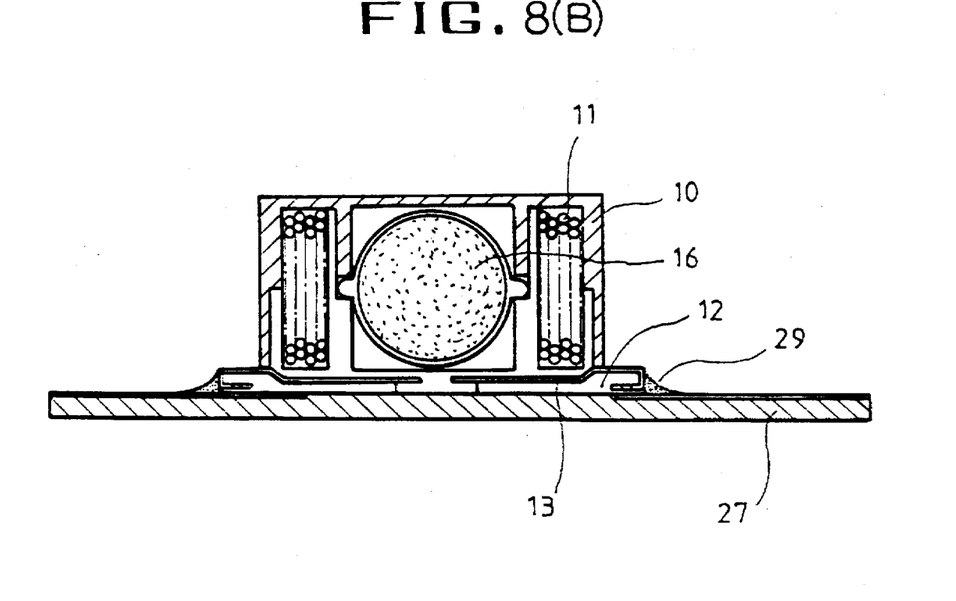

FIGS. 8A and 8B each shows an exciter having electrode terminals of plate type. This exciter is easily mounted on a main printed circuit board 27 by automatic mounting system. In these figures, reference numeral 29 is a solder.

The resultant exciter of this invention employs a blushless type, so that no noise is produced from the exciter. This exciter operates under AC of 1.0 to 220 V and the frequency of the vibration can be easily performed within the scope of 65 to 220 Hz.

What is claimed is:

1. An exciter for generating physical vibration in response to an incoming call, comprising:

a lower housing having a base and a cylindrical inner guide which is vertically disposed on the base, the inner guide having an inner wall and an upper opening to form a predetermined space at a central portion;

a stator, attached to a periphery of the an inner guide of the lower housing, for generating an electromagnetic force which is converted in an upper or lower direction responsive to an AC signal from the outside;

a rotor having a rotation part disposed in an inner space of the inner guide, the rotation part comprising an axial guide having two ends, said ends being rotatably supported by the inner wall of the inner guide, for rotating responsive to the electromagnetic force; and an upper housing having a pair of downwardly projecting portions engaged with the inner guide of the lower housing to rotatably support both said ends of the axial guide, and an outer cylindrical portion engaged with the lower housing to surround the stator, whereby the exciter generates vibration at the upper and lower housings responsive to a rotation movement of the rotation part.

2. An exciter of claim 1, wherein the stator comprises a driving coil wound on an peripheral surface of the inner guide of the lower housing.

3. An exciter of claim 1, wherein the rotor comprises:

a permanent magnet;

a permanent magnet;

a magnet housing surrounding the permanent magnet; and said two ends of the axial guide oppositely disposed on two sides of the magnet housing to function as a rotation shaft of the permanent magnet.

4. An exciter of claim 3, wherein said two ends of the axial guide of the rotor are on a horizontal line passing through a center of a gravity of the permanent magnet, and the upper housing further comprising an inner guide, wherein a pair of opposite projecting parts, disposed on an inner side of the inner guide of the upper housing for defining the rotation movement of the rotor and transmitting shocks resulted from the rotation movement.

5. An exciter of claim 3, wherein said two ends of the axial guide of the rotor are on a line shifted in parallel from a horizontal line passing through a center of a gravity of the permanent magnet.

6. An exciter of claim 3, wherein said two ends of the axial guide of the rotor are on a line rotated in an clockwise or counterclockwise direction as much as a predetermined angle from a horizontal line passing through a center of a gravity of the permanent magnet, on a basis of the center of its gravity.

7. An exciter of claim 1, wherein a center of a gravity of the rotor is shifted from a connection line of both said ends of the axial guide.

8. An exciter of claim 1, wherein the rotor comprises the rotation part made of a permanent magnet and the axial guide functions as a shaft attached to the rotation part.

9. An exciter of claim 1, wherein the rotor has an asymmetry structure in view of an connection line of both said ends of the axial guide.

10. An exciter of claim 1, further comprising a vibration transmission material of fluid, charged in the inner space of the inner guide, for transferring the rotating force of the rotor to the upper and lower housings.

11. An exciter of claim 1, wherein the inner guide of the lower housing has a pair of grooves, to which both said ends of the axial guide are inserted.

12. An exciter of claim 1, further comprising a pair of electrode embedded in the base of the lower housing and electrically connected to the rotor, for receiving the AC signal from outside.

13. An exciter of claim 12, wherein each electrode comprises any one selected from a plate type, rugged type and wire type.

14. An exciter of claim 1, wherein the base of the lower housing is rectangular-shaped.

15. An exciter of claim 1, wherein the base of the lower housing is round-shaped.

16. An exciter for generating physical vibration in response to transmitted signal, comprising:

a lower housing having a base, an inner guide which is vertically disposed on the base, the inner guide forming a predetermined space inside, and an outer guide which is vertically disposed with a regular interval from the inner guide;

a driving coil, disposed between the inner guide and the outer guide of the lower housing, for generating an electromagnetic force; and a moving magnet having a shaft which is rotatably supported by the inner guide of the lower housing, for rotating in response to the electromagnetic force; and an upper housing having projecting portions engaged with the inner guide of the lower housing and a cylindrical member engaged with the outer guide of the lower housing for surrounding the driving coil, the projecting portions supporting the shaft of the moving magnet with respect to an upper direction, wherein a center of a gravity of the moving magnet is positioned on a shifted state from the shaft.

* * * * *